United States Patent [19]

Reutter

[11] Patent Number: 5,083,970

[45] Date of Patent: Jan. 28, 1992

[54] METHOD AND A FILLING MACHINE FOR PRODUCING SAUSAGES BY DIVIDING A SAUSAGE STRING

[75] Inventor: Siegfried Reutter, Eberhardzell, Fed. Rep. of Germany

[73] Assignee: Albert Handtmann Maschinenfabrick GmbH & Co. KG, Fed. Rep. of Germany

[21] Appl. No.: 556,368

[22] Filed: Jul. 24, 1990

[30] Foreign Application Priority Data

Jan. 31, 1990 [DE] Fed. Rep. of Germany ... 9001076[U]

[51] Int. Cl.⁵ .................................. A22C 11/02
[52] U.S. Cl. .......................... 452/30; 452/31; 452/46
[58] Field of Search .................. 452/30, 31, 37, 46

[56] References Cited

U.S. PATENT DOCUMENTS

| | | | |
|---|---|---|---|
| 3,659,316 | 5/1972 | Berendt et al. | 452/31 |
| 4,558,488 | 12/1985 | Martinek | 452/31 |
| 4,563,792 | 1/1986 | Niedecker | 452/31 |
| 4,602,402 | 7/1986 | Schnell | 452/31 |
| 4,625,362 | 12/1986 | Kollross et al. | 452/31 |
| 4,766,645 | 8/1988 | Lamartino et al. | 452/37 |
| 4,837,897 | 6/1989 | Lamartino | 452/31 |

FOREIGN PATENT DOCUMENTS

| | | |
|---|---|---|
| 0013552 | 1/1980 | European Pat. Off. . |
| 0019711 | 4/1980 | European Pat. Off. . |
| 0061995 | 5/1982 | European Pat. Off. . |
| 0204086 | 3/1986 | European Pat. Off. . |
| 1632093 | 8/1970 | Fed. Rep. of Germany . |
| 2249070 | 4/1974 | Fed. Rep. of Germany . |
| 377166 | 12/1964 | France . |

*Primary Examiner*—Willi Little
*Attorney, Agent, or Firm*—Finnegan, Henderson, Farabow, Garrett & Dunner

[57] ABSTRACT

A method and apparatus for producing sausages of equal length by dividing a sausage string produced by a filling machine and discharged from a dividing means, which include sensing the central, cylindrical part of the sausage is with a measuring roll and producing length pulses in the course of this process simultaneously producing volume pulses corresponding to the meat volume transported during this period of length measurement and comparing length pulses with the volume pulses, whereupon the total number of volume pulses required for producing the desired length of the sausage is calculated in a control means and the discharge of the sausage meat is stopped when said total number of volume pulses has been reached, the dividing process than being initiated.

4 Claims, 2 Drawing Sheets

METHOD AND A FILLING MACHINE FOR PRODUCING SAUSAGES BY DIVIDING A SAUSAGE STRING

BACKGROUND OF THE INVENTION

The present invention relates to a method and apparatus for producing sausages by dividing a sausage string produced by a filling machine and discharged from a dividing means into sausages.

Normally, sausages of identical weight and volume, respectively, are produced by the above-mentioned method and machine.

The present invention is based on developing a method and a machine of the known type in such a way that sausages of equal length are produced.

This is required in cases in which a group of such sausages is packed in a container, e.g. in a tin.

SUMMARY OF THE INVENTION

The invention provides in a method for producing sausages the step of sensing the cylindrical part (measurement part) of the sausage with a measuring roll and producing length pulses in the course of this process, corresponding to the length sensed. The sausage meat volume transported during this period of length measurement is simultaneously converted into volume pulses, and the length pulses are then compared with the volume pulses, whereupon the total number of volume pulses required for producing the desired length of the sausage is calculated in a control means and the discharge of sausage meat is stopped when said total number of volume pulses has been reached, the dividing process sausages being then initiated.

There is also provided in a filling machine including a portioning means and a division means, which divides the sausage string, for producing divided sausages, a measuring roll, which rests on the sausage string and which is in rolling contact therewith and is arranged subsequent to the division means when seen in the discharge direction of the sausage string, said measuring roll being connected to a length pulse generator. In addition, the portioning means is provided with a volume pulse generator, and a control means is provided, which is connected to the length pulse generator and the volume pulse generator and which includes a computer.

As long as the sausages are sausages in natural sausage casings, it is advantageous to use a second measuring roll of this type, provided with a pulse generator, that is arranged in opposite relationship with said first measuring roll. This has the effect that errors are minimized, which would otherwise be caused when sausages having a curved shape or sausages having a constriction on one side thereof are sensed. The value used as a length pulse is then the mean value of the pulses produced on the opposite sides.

BRIEF DESCRIPTION OF THE DRAWINGS

An embodiment of the filling machine will be explained in the drawings, in which.

DETAILED DESCRIPTION OF THE INVENTION

Figure 1:
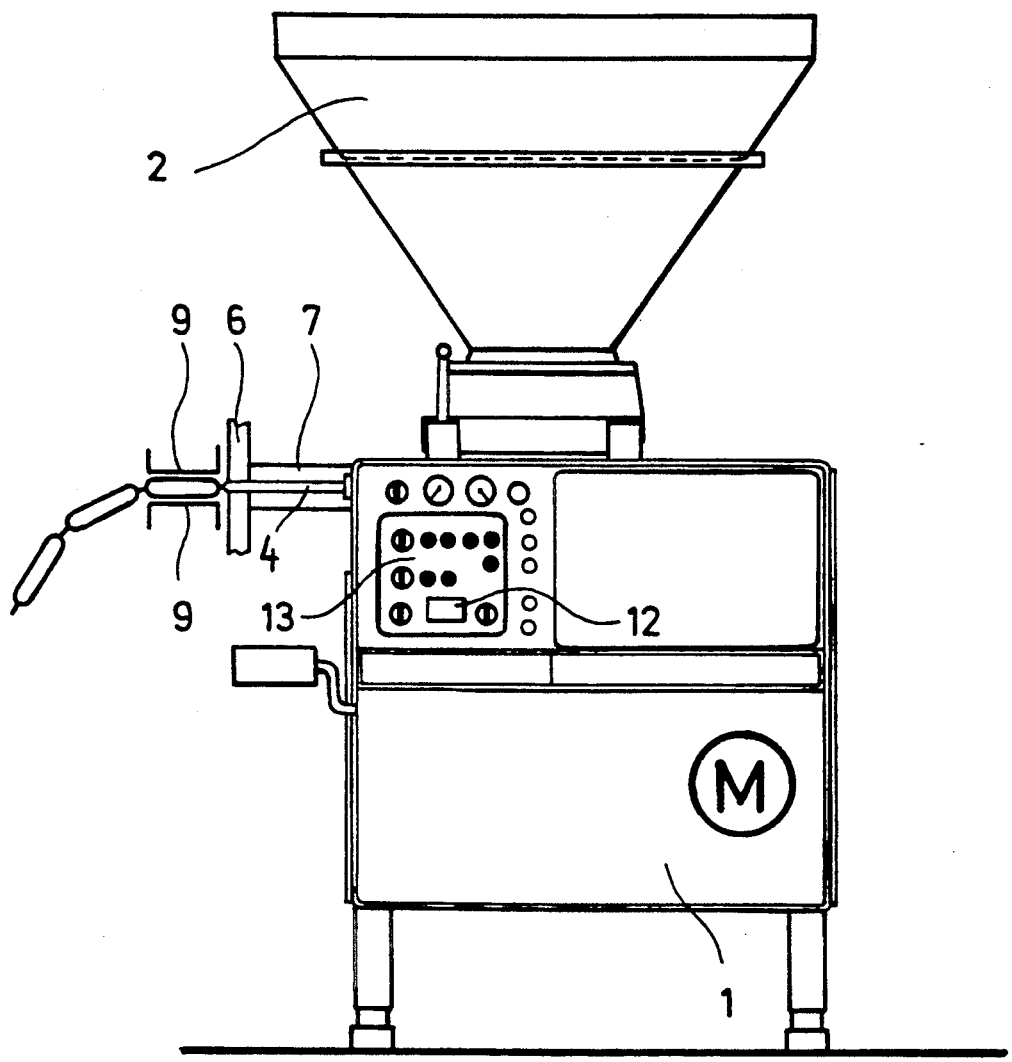
FIG. 1 is a side view of a schematic representation of the filling machine and FIG. 2 shows a detail of the filling machine.

The filling machine has a housing 1 whose upper side has arranged thereon a feeding hopper 2, the sausage meat being filled into said feeding hopper.

A vane pump 3, which is used as a portioning means or metering device, is provided below the feeding hopper 2. This vane pump 3 is driven via a gear means, which is not shown, with the aid of an electric motor M arranged in the lower area of the housing 1.

The discharge of the vane pump 3 is followed by a filling pipe 4—which is arranged such that it sticks out of the housing 1—said filling pipe having arranged thereon the sausage casing 13 bunched up in the form of a caterpillar 5.

The front end of the filling pipe 4 has secured thereto a dividing means 6 with the aid of a holder 7 which periodically twists the filled sausage casing to divide it into individual sausages.

The sausage string 8, that has already been discharged from the filling pipe 4, is guided by two oppositely disposed guide means 9, e.g. in the form of endless, circulating conveyor belts, that prevent it from rotating.

Figure 2:
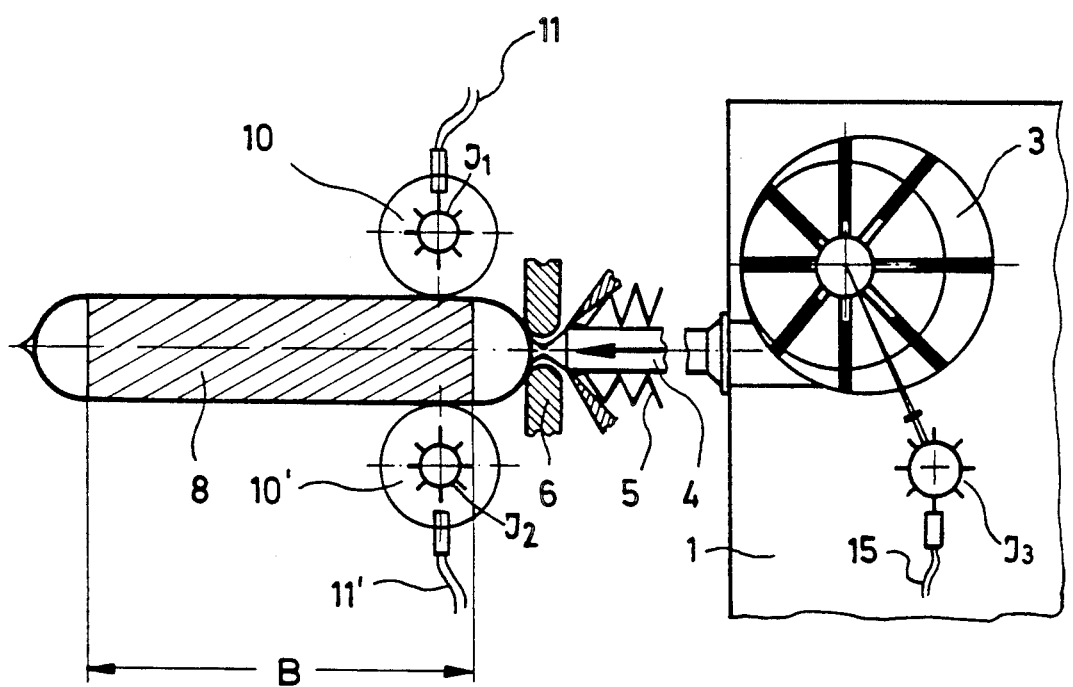

As can be seen in FIG. 2, two oppositely disposed measuring rolls 10 are arranged relative to the sausage string. The measuring rolls 10 are supported by means of holders not shown of the housing on the dividing means.

The support means of the measuring rolls are of such a nature that the distance between the measuring rolls 10 can be adjusted. The adjustment is effected in such a way that the measuring rolls 10 and 10' are kept in contact with the sausage string and that the sausage causes them to rotate while moving forward. (For the sake of clarity, FIG. 2 shows the two measuring rolls with a rotational displacement of 90°).

The measuring roll 10 has positively connected thereto a pulse generator means J1 and the measuring roll 10' has positively connected thereto a pulse generator means J2 so that the pulse generators means are activated by the rotary movement of the measuring roll associated therewith. Each of the two pulse generators means J1 and J2 is connected to a control means 12 via an electric line 11 and 11', respectively, said control means being part of a switchboard 13.

The control means 12 includes a computer and controls the drive of the vane pump 3 and the dividing means 6 as well as, if necessary, the endless conveyor belts, which serve as guide means 9.

The rotor 14 of the vane pump 3 is positively connected to a pulse generator means J3, which is also connected to the control means 12 via an electric line 15.

The pulse generators means J1 and J2 sense the sausage string 8 throughout a measuring area B of the sausage wherein the sausage string is essentially cylindrical.

The approximately semispherical ends, which follow the cylindrical section, define together with said cylindrical section the portion length of the sausage.

The filling machine used to carry out the method is described hereinbelow.

The sausage meat, which is contained in the feeding hopper 2, is fed to the vane pump 3, and the rotation of said vane pump forcibly presses the sausage meat into the filling pipe 4. The vane pump acts in this respect as a portioning means or metering device, a predetermined volume of sausage meat being discharged per angular degree of rotation. After having been discharged from the end of the filling pipe, the sausage meat enters the sausage casing 5 arranged on said filling pipe 4.

The end of the sausage string will have been twisted shut in a previous dividing step division process.

As soon as the cylindrical part of the sausage string 8 enters the area of the measuring rolls 10 and 10', said measuring rolls will be driven by the sausage moving string. The lengths pulse means generator J1 and J2 will generate length pulses corresponding to the degree of rotation of the rolls and hence the length of sausage string measured or sensed.

At the same time, the volume pulse generator means J3 is rotated by the vane pump and generates volume pulses corresponding to the volume of sausage meat pumped.

As soon as the measuring rolls 10 and 10' have reached the point where the measuring area B begins, the length pulse generator means and the volume pulse generator means are activated in such a way that their pulses are transmitted to the control means 12, each volume pulse being representative of a specific length of the sausage string 8 discharged.

In the control means 12, the length pulses, which are produced in the measuring area B by the length pulse generator means J1 and J2, are compared with the volume pulses, which are simultaneously produced by the volume pulse generator means J3.

Depending on the diameter of the sausage string 8, a computer calculates which length variation occurs per volume pulse.

It follows that the length pulses produced upon discharge of the sausage string 8 are, for the time being, only evaluated throughout the measuring range B where disturbance variables, the shape of the sausage ends as well as measuring errors in the form of slippage in the start-stop region are eliminated.

It is now still necessary to calculate, in addition to the length of the measuring area B, the length of the sausage ends in depending on the diameter of the sausage string and to add this value to the volume.

This can, from a purely mathematical point of view, be done e.g. by calculating the difference in volume between a cylinder having a diameter d and a length 1=d and a ball having the diameter and by adding the thus calculated volume with the aid of the volume pulse generator means J3 and by initiating then the twist-off process by the dividing means 6.

Another possibility, however, is that, after comparing the length pulses and the volume pulses along the measuring area B, the control is carried out in such a way that, after the above-mentioned comparison, the volume for a cylindrical portion having a length L is calculated and one or several sausages having such an excessive length are first produced, whereupon a correction factor is inputted in the computer, said correction factor being determined e.g. on the basis of pragmatical values and resulting in the production of a sausage having the desired length value.

It is, however, also possible to reduce the length of the sausage step by step by a plurality of corrections until the sausage will finally have the desired length and the number of volume pulses required for this length will be stored, said number of volume pulses being then taken as a basis for the subsequent production of additional sausages. The measuring area B should be as large as possible so that the optimum accuracy of sausage length can be achieved.

When, for the purpose of length measurement, two measuring rolls 10 and 10' are arranged in opposite relationship with each other, errors can be avoided, which might be caused due to the curved shape of the sausage.

I claim:

1. A method for making sausages of desired length from a sausage string comprising forming a continuous string of sausage meat stuffed into a cylindrical casing, sensing the length of the central, cylindrical part of the sausage string being produced and generating length pulses corresponding to the length sensed, simultaneously sensing the volume of sausage meat being stuffed during the period of time of length sensing and generating volume pulses corresponding to the volume sensed, comparing the length pulses with the volume pulses to determine the number of volume pulses that corresponds to the desired length of sausage and stopping the stuffing of said meat into said casing and dividing the sausage string into a sausage when said number of volume pulses has been reached.

2. The method of claim 1, wherein sausages of a length greater than that desired are first produced and the total number of volume pulses generated to fill said length are calculated to determine the ratio of meat stuffed per length pulse and thereafter stopping the volume of meat stuffed and dividing the sausage string into sausages when the total number of volume pulses corresponding to said desired length is reached.

3. In an apparatus for making sausages from a continuous sausage string including a portioning means for stuffing predetermined volumes of sausage meat into a casing to form said string and dividing means for dividing the sausage string into sausages, the improvement comprising a measuring roll in contact with the outer surface of one side of the sausage string downstream of the dividing means, a length pulse generator means connected to said measuring roll for generating length pulses corresponding to the length measured by said roll, volume pulse generator means connected to the portioning means for simultaneously generating volume pulses corresponding to the volume of sausage meat stuffed during the period of time the length of pulses are being generated and control means for receiving and comparing the length pulses and volume pulses and for adjusting the protioning means and dividing means to produce sausages of the desired length.

4. The apparatus of claim 3, including a second measuring roll located on the opposite side of the sausage string from said measuring roll and a second length pulse generator means connected to said second measuring roll for generating second length pulses corresponding to the length measured by said second roll, said control means receiving said second length pulse and integrating them with the length pulses received from said measuring roll.

* * * * *